Figure 1:
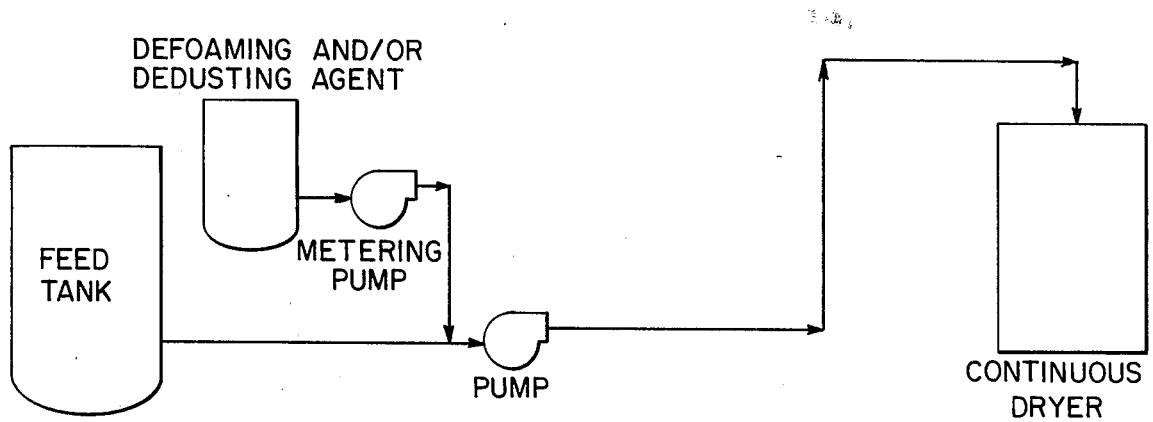

United States Patent [19]

Sandefur et al.

[11] 4,327,998

[45] May 4, 1982

[54] PROCESS FOR MANUFACTURING OF DYESTUFF PREPARATIONS

[75] Inventors: Charles W. Sandefur, Summerville, S.C.; Donald F. Lindow, Secaucus, N.J.; Thomas J. Thomas, Summerville, S.C.

[73] Assignee: Mobay Chemical Corporation, West Pittsburgh, Pa.

[21] Appl. No.: 245,286

[22] Filed: Mar. 19, 1981

Related U.S. Application Data

[63] Continuation-in-part of Ser. No. 196,239, Oct. 14, 1980, abandoned, which is a continuation of Ser. No. 18,044, Mar. 6, 1979, abandoned.

[51] Int. Cl.$^3$ .................... C09B 67/06; C09B 67/10
[52] U.S. Cl. .................................. 8/524; 260/208; 252/301.21; 34/12
[58] Field of Search ..................... 8/524; 260/208; 252/301.21; 34/12

[56] References Cited

U.S. PATENT DOCUMENTS

| 2,070,739 | 2/1937 | Krauss et al. | 8/524 |
| 2,574,597 | 11/1951 | Salvin et al. | 8/524 |
| 4,069,013 | 1/1978 | Hett et al. | 8/524 |

FOREIGN PATENT DOCUMENTS

| 1373167 | 11/1974 | United Kingdom | 8/524 |
| 1431881 | 4/1976 | United Kingdom | 8/524 |

Primary Examiner—Maria Parrish Tungol
Attorney, Agent, or Firm—Sprung, Horn, Kramer & Woods

[57] ABSTRACT

This invention relates to the preparation of low foam generating and/or low dusting dyestuff or fluorescent whitening agent formulations by continuous introduction of defoaming and/or dedusting agents into the feed stream carrying the aqueous dyestuff or fluorescent whitening agent preparation to a drying apparatus.

9 Claims, 2 Drawing Figures

PROCESS FOR MANUFACTURING OF DYESTUFF PREPARATIONS

This application is a continuation-in-part of application Ser. No. 196,239, filed Oct. 14, 1980, now abandoned which is a continuation of application Ser. No. 018,044, filed Mar. 6, 1979, now abandoned.

The matter of the invention is a process for manufacture of low dusting and/or low foam generating dyestuff or fluorescent whitening agent powders or granulates.

Handling of powder or granular dyestuff or fluorescent whitening agent preparations often is hampered by their dustiness. Preparations of disperse dyestuffs, which contain large amounts of dispersing agents in order to insure sufficient dispersion stability under application conditions, in addition cause more or less severe foam formation during application, resulting in unlevel dyeings. The foaming problem is particularly severe in the -called JET-dyeing process.

In order to overcome the dusting and foaming problems, dedusting and/or defoaming agents are usually added in a batchwise operation to the dyestuff preparation or the fluorescent whitening agent preparation before or after drying. An alternate method to overcome foaming problems consists of addition of defoaming agents directly to the dyebaths.

The presently applied methods exhibit numerous disadvantages. For example, addition of dedusting or defoaming agents to the dried dyestuff or fluorescent whitening agent preparation often results in formation of lumps which in turn give rise to stippled or "specky" dyeings. If, on the other hand, these dedusting and/or defoaming agents are added to the aqueous dyestuff or fluorescent whitening agent preparations in the storage tank prior to the drying process, these additives often separate into agglomerates or droplets which tend to deposit on the walls of the storage tank and therefore cannot perform their intended function in the dried dyestuff or fluorescent whitening agent preparation. Even if this agglomeration does not occur, the addition of even relatively high amounts of dedusting or defoaming agents often does not satisfactorily suppress the dusting and/or foaming. Moreover, in the case of disperse dyestuffs, incompatibilities between the additives and the dyestuff dispersion cause more or less severe deterioration of the dispersion properties in numerous cases, leading to problems during application such as specking, smearing and unlevel dyeings. These incompatibilities between additives and dyestuff dispersions give rise to similar problems if the additives are added directly to the dyebaths.

What we found is that powder or granular dyestuff or fluorescent whitening agent preparations with the desired low dusting and/or low foaming characteristics without the above mentioned disadvantages are obtained by continuously introducing the dedusting and/or defoaming agents in form of a liquid, solution, dispersion, or emulsion into the pipeline carrying the solution, slurry or dispersion of the dyestuff or fluorescent whitening agent from a holding tank to the drying equipment immediately before the dyestuff or fluorescent whitening agent solution, slurry or dispersion enters the drying equipment. A sufficiently homogeneous distribution of the dedusting and/or defoaming agent in the dyestuff or fluorescent whitening agent solution, slurry or dispersion is essential. If the turbulence in the pipeline is sufficient, no special mixing device is required to provide this homogeneity. Otherwise a mechanical mixing device, e.g. a static mixer, is required.

This technique minimizes the contact time between the additives and the aqueous dyestuff or fluorescent whitening agent preparation and thereby minimizes or eliminates the above mentioned shortcomings which occur as a result of addition of the additives directly to the storage tank in a batchwise operation. Contact times of one second to seven minutes, but preferably in the range from ten seconds to three minutes, between the dedusting and/or defoaming agents and the aqueous dyestuff or fluorescent whitening agent preparation are sufficient for achieving the desired low dusting and/or low foaming characteristics.

Suitable drying apparatuses for carrying out the method of the process of the invention are spray dryer, thin film dryer, e.g. rotary drum dryer or wiped film dryer, continuous rotary vacuum dryer, agitated or non-agitated fluid bed dryers, and other continuous drying equipment. The preferred drying apparatus is the spray dryer.

Figure 2:
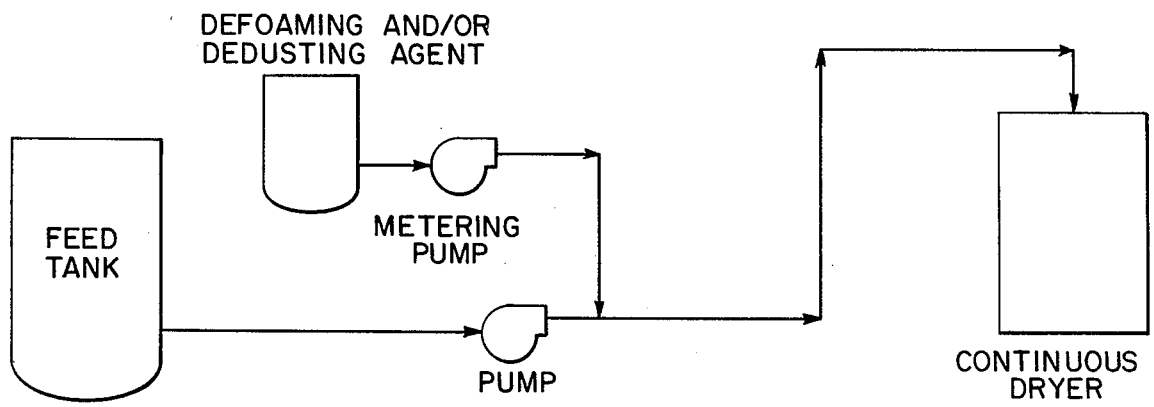

This method does not require fabrication of specialty equipment. The defoaming and/or dedusting agents can be added into the product feed stream of one of the usual continuous drying apparatus on the inlet or outlet side of the feeding device by means of any usual metering pump, for example on the outlet side of a feed pump as indicated in FIG. 1 or on the inlet side of a feed pump as indicated in FIG. 2. Suitable feed pumps are for example progressive cavity pumps or gear pumps and the like. Suitable metering pumps include for example progressive cavity pumps, gear pumps, piston pumps and the like.

The method of the invention, in principal, is suitable for the manufacture of preparations of all the usual dyestuff or fluorescent whitening agent classes. Of special interest is the application of the method of the invention for the manufacture of dry preparations of water insoluble dyestuffs and water insoluble fluorescent whitening agents.

Suitable water insoluble dyestuffs are the usual commercial disperse dyestuffs as well as disperse fluorescent whitening agents. Suitable disperse dyestuffs are for example dyestuffs from the classes of anthraquinone dyestuffs, azo dyestuffs, methine dyestuffs, indigo dyestuffs and thioindigo dyestuffs. Suitable disperse fluorescent whitening agents are for example those of the coumarine and pyrazoline type.

Suitable dedusting agents are cyclic hydrocarbons, e.g. decalin and tetralin, phthalic acid dialkyl esters and especially mineral oils with a boiling range from 130° to 300° C. as well as partially sulfonated mineral oils or mixtures of these materials with emulsifiers, preferably nonionic emulsifiers.

Suitable defoaming agents include fats, fatty alcohols fatty acids or their salts, fatty acid esters, fatty acid amides, trialkyl phosphates, paraffin oils and silicone oils, or mixtures thereof.

The amount of the required defoaming and/or dedusting agents may vary within the usual limits. In general, amounts between 0.1% and 2.0% by weight of the pure dyestuff or fluorescent whitening agent are required.

The method of the invention is illustrated by the following examples:

EXAMPLE 1

313 g of a water-wet presscake containing 27.8% solids of Disperse Blue 56 are blended with 251 g of a lignin-sulfonate dispersant in a blender together with 100 ml of water to maintain fluidity. The resulting slurry is milled, first using a rotor-stator colloid mill and subsequently using a sand mill filled with 1.0 mm glass beads, for approximately 30 minutes at 20°–30° C., resulting in 664 g of a dyestuff dispersion having an average particle size of 0.3 microns. The resulting dispersion is pumped with a positive displacement pump to the atomizer wheel of a spray dryer. A 7.7% aqueous emulsion of a defoamer mixture of 7.1% hydrophobic silica, 12.8% light mineral oil, 75.0% low alkoxylated fatty alcohols and esters and 5.1% alkoxylated polyethylene glycol ester is added into the spray dryer feedline according to FIG. 2 at a constant rate of 14 ml per 100 ml of the dyestuff dispersion so that the final dyestuff as it emerges from the spray dryer as a dry powder contains 2% by weight of this defoamer mixture. The inlet temperature of the spray dryer is held at 220° C. and the outlet temperature is held at 90° C.

To evaluate the foaming properties the following test is performed: One gram of the dyestuff powder is blended by hand with 25 ml of distilled water at 49° C. in a 400 ml beaker. This mixture is further diluted with 175 ml of distilled water at 49° C. The pH of this mixture is adjusted to 4.5–5.0 with acetic acid. If the temperature of the mixture has dropped below 49° C., the mixture is reheated to 49° C. The dyestuff dispersion is poured into a Waring$^R$ Blender Model 700 and blended for 30 seconds at highest speed. The contents of the blender are immediately poured into a 500 ml graduated cylinder. The total volume of the foam plus liquid is measured immediately after the contents of the blender have been transferred to the cylinder. The total volume of foam plus liquid is measured again after 2 minutes. The foam level is defined as the total volume minus the original volume (200 ml). Result: 45 ml of foam initially, 20 ml of foam after two minutes.

To evaluate the dispersion properties the following test is performed (American Association of Textile Colorists and Chemists Standard Method 146-1977): Two grams of the dyestuff powder are blended by hand with 10 ml of distilled water at 49° C. in a 400 ml beaker. Distilled water at 49° C. is added in 10 ml increments while stirring until a total volume of 180 ml is obtained. The pH of this mixture is adjusted to 4.0–4.5 with acetic acid. Distilled water at 49° C. is added to obtain a total volume of 200 ml. This mixture is heated to 71° C. over a 5-10 minute period and filtered through a 9.0 cm Buechner funnel containing one sheet of Whatman$^R$#2 filter paper on top of one sheet of Whatman$^R$#4 filter paper at a vacuum of 25 inches of mercury. The filtration time is recorded. Result: Filtration time 14 seconds.

EXAMPLE 2

(Comparison with Example 1)

93 g of the defoamer mixture emulsion described in Example 1 are added to the 664 g of dyestuff dispersion prepared as described in Example 1 and the entire mass is stirred approximately 4 hours to achieve homogeneity. The resulting mixture is pumped to the atomizer wheel of the spray dryer with the same positive displacement pump as used in Example 1. The inlet temperature of the spray dryer and the outlet temperature of the spray dryer are the same as described in Example 1. The final dyestuff as it emerges from the spray dryer as a dry powder contains 2% by weight of the defoamer mixture.

When the foaming properties of this dyestuff powder are evaluated by the same test as described in Example 1, the following results are obtained: 190 ml of foam initially, 170 ml of foam after 2 minutes.

When the dispersion properties of this dyestuff powder are evaluated by the same test as described in Example 1, the following result is obtained: Filtration time 65 seconds.

EXAMPLE 3

An aqueous solution of Acid Black 172 containing 14.6% color solids is pumped at a rate of 62 kg of solution per hour with a positive displacement pump to the single fluid nozzle atomizer assembly of an IWK$^R$ (Industriewerke Karlsruhe) spray dryer with a ring canal particle size classifier. A 12.5% aqueous emulsion of partially sulfonated mineral oil is added as dedusting agent into the spray dryer feedline according to FIG. 2 at a constant rate of 1.63 liters per hour. The resulting mixture is spray dried at an inlet temperature of 200° C. and an outlet temperature of 100° C. to yield 9.05 kg per hour of dry dyestuff granules containing 7% residual moisture. The dyestuff preparation consists of free flowing, low dusting granules.

EXAMPLE 4

(Comparison with Example 3)

1,000 kg of an aqueous solution of Acid Black 172 as described in Example 3 is mixed with 26.3 kg of the 12.5% aqueous emulsion of partially sulfonated mineral oils described in Example 3 in the feed tank of a spray dryer and stirred for approximately 4 hours to ensure homogeneity. The resulting mixture is pumped to the same atomizer assembly of the spray dryer described in Example 3 with the same positive displacement pump and spray dried at the same inlet and outlet temperatures specified in Example 3 to yield a dry dryestuff preparation containing 7% residual moisture. The resulting granular dyestuff preparation is considerably dustier than the corresponding dry dyestuff preparation described in Example 3.

EXAMPLE 5

214 g of a water wet presscake containing 75% color solids of Disperse Red 60 are blended with 410 g of a lignin-sulfonate dispersant in a blender together with 1,000 g water to maintain fluidity. The resulting slurry is milled, first using a rotor stator colloid mill and subsequently using a sand mill filled with 1.0 mm glass beads for approximately one hour at 20°–30° C., resulting in 1715 g of dyestuff dispersion having an average particle size of 0.3 microns.

The dispersion is pumped with a positive displacement pump to the atomizer wheel of a spray dryer. A 10% aqueous emulsion of a dedusting agent mixture containing equal parts by weight of a partially sulfonated and a non-sulfonated mineral oil is added into the spray dryer feedline according to FIG. 2 at a constant rate of 10 ml of emulsion per 286 ml of dyestuff dispersion. The inlet temperature of the spray dryer is held at 185° C. and the outlet temperature of the spray dryer is held at 85° C. The dry dyestuff powder as it emerges from the spray dryer contains 0.5% of the unsulfonated and 0.5% of the sulfonated mineral oil dedusting agent and 4% residual moisture. This dyestuff powder exhibits low dusting characteristics. When the dispersion properties of the dyestuff powder, after storage at room temperature for 35 days, are evaluated by the same test as described in Example 1, a filtration time of 12 seconds is observed.

EXAMPLE 6

(Comparison with Example 5)

A dispersion of Disperse Red 60 is prepared as described in Example 5. 60 g of the aqueous dedusting agent emulsion described in Example 5 are added to the dispersion and stirred for 4 hours to obtain homogeneity. The resulting slurry is pumped to the atomizer wheel of the spray dryer described in Example 5 using the same positive displacement pump as used in Example 5. The slurry is spray dried at the same inlet and outlet temperatures as specified in Example 5 to yield a dry dyestuff powder with a residual moisture content of 4% and 0.5% of the unsulfonated and 0.5% of the partially sulfonated dedusting agent. The dyestuff powder is dustier than the dyestuff powder prepared according to Example 5. When the dispersion properties of the dyestuff powder are tested after 35 days of storage at room temperature, using the test method as described in Example 1, a filtration time of 42 seconds is observed.

The process produces the desired result even with small scale operation but the advantages are most important when the continuous flow from the holding tank to the dryer takes at least 1 hour and especially at least 4 hours, as is the case in commercial scale operation. Thus, in Example 3 for instance, the holding tank initially contained 1026.3 kg of solution so that pumping at the rate of 62 kg of solution per hour took 16.55 hours to empty the tank.

It will be appreciated that the instant specification and examples are set forth by way of illustration and not limitation, and that various modifications and changes may be made without departing from the spirit and scope of the present invention.

What is claimed is:

1. A process for the manufacture of a dyestuff or fluorescent whitening agent powder or granulate which in subsequent use will exhibit low dusting and low foam generating properties comprising continuously over a period of at least one hour passing a feed stream having the dyestuff or whitening agent dissolved, slurried or dispersed therein from a holding station to a drying operation, and continuously adding an agent for defoaming, dedusting or both at a constant rate into the feed stream as it passes from the holding station to the drying operation.

2. A process according to claim 1, wherein the passage of the feed stream and the addition of the agent or mixture thereof is carried out over a period of at least about 4 hours.

3. A process according to claim 1, wherein the feed stream is passed through a pumping station on its passage from the holding station to the drying operation and the addition of the agent to the feed stream is effected adjacent the downstream side of the pumping station.

4. A process according to claim 1, wherein the feed stream is passed through a pumping station on its passage from the holding station to the drying operation and the addition of the agent to the feed stream is effected adjacent the upstream side of the pumping station.

5. A process according to claim 1, wherein the contact time between the feed stream and agent until they reach the drying operation is from one second to seven minutes.

6. A process according to claim 1, wherein the contact time between the feed stream and agent until they reach the drying operation is from ten seconds to three minutes.

7. A process according to claim 1, wherein drying is effected by spray drying.

8. A process according to claim 1, wherein the feed stream is a dispersion of a disperse dyestuff.

9. A process according to claim 2, wherein the feed stream is passed through a pumping station on its passage from the holding station to the drying operation which is effected by spray drying, the addition of the agent to the feed stream is effected adjacent the pumping station, and the contact time is from ten seconds to three minutes.

* * * * *